(12) United States Patent
Yoshida

(10) Patent No.: US 7,200,639 B1
(45) Date of Patent: Apr. 3, 2007

(54) REMOTE CONTROL SYSTEM, SERVER-CLIENT SYSTEM, SERVER FOR CONTROLLING TERMINAL DEVICE, TERMINAL DEVICE OPERATING METHOD, DEVICE INFORMATION SHARING METHOD, STORAGE MEDIA, AND PROGRAM TRANSMISSION APPARATUS

(75) Inventor: Ryo Yoshida, Komae (JP)

(73) Assignee: International Bussiness Machines Corporation, Armonk, NY (US)

( * ) Notice: Subject to any disclaimer, the term of this patent is extended or adjusted under 35 U.S.C. 154(b) by 724 days.

(21) Appl. No.: 09/712,576

(22) Filed: Nov. 14, 2000

(30) Foreign Application Priority Data

Nov. 15, 1999 (JP) .................. 11-324672

(51) Int. Cl.
  G06F 15/16   (2006.01)
  G06F 15/173  (2006.01)
  G06F 17/50   (2006.01)
  G06F 9/44    (2006.01)
  G06F 3/00    (2006.01)

(52) U.S. Cl. ............ 709/208; 709/219; 709/223; 709/224; 709/226; 715/757; 715/782; 715/848; 715/850; 703/13; 703/20; 703/21; 703/24

(58) Field of Classification Search ........... 707/164; 709/219, 217, 212, 202, 223, 203, 224, 216, 709/226, 208; 703/1, 13, 20, 21, 24; 700/245; 348/114; 715/757, 782, 848, 850
See application file for complete search history.

(56) References Cited

U.S. PATENT DOCUMENTS

| 4,855,822 A | * | 8/1989 | Narendra et al. ........... 348/114 |
| 5,904,724 A | * | 5/1999 | Margolin .................... 701/120 |
| 5,999,944 A | * | 12/1999 | Lipkin ...................... 707/104.1 |
| 6,061,603 A | * | 5/2000 | Papadopoulos et al. ....... 700/83 |
| 6,138,150 A | * | 10/2000 | Nichols et al. ............. 709/219 |
| 6,175,842 B1 | * | 1/2001 | Kirk et al. .................. 709/219 |
| 6,219,708 B1 | * | 4/2001 | Martenson .................. 709/226 |
| 6,295,513 B1 | * | 9/2001 | Thackston .................... 703/1 |
| 6,370,582 B1 | * | 4/2002 | Lim et al. ................... 709/230 |

(Continued)

FOREIGN PATENT DOCUMENTS

JP    07-131542    5/1995

(Continued)

Primary Examiner—Saleh Najjar
Assistant Examiner—Benjamin R Bruckhart
(74) Attorney, Agent, or Firm—John Campbell; Heslin Rothenberg Farley & Mesiti P.C.

(57) ABSTRACT

A remote control system includes: an electric home terminal device 11 having a control program; a server PC 12, for transmitting control data to the electric home terminal device 11 and for registering three-dimensional model data concerning the electric home terminal device 11; and client PCs 14, 15 and 16, for receiving the three-dimensional model data from the server PC 12, wherein the client PCs 14, 15 and 16 perform an additional operation upon the receipt of specific three-dimensional model data from the server PC 12, and transmit, to the server PC 12, update data for a three-dimensional model obtained by the additional operation, and wherein the server PC 12 transmits, to the electric home terminal device 11, the control data based on the update data for a three-dimensional model received from the client PCs 14, 15 and 16.

19 Claims, 15 Drawing Sheets

U.S. PATENT DOCUMENTS 6,404,437 B1 * 6/2002 Russell et al. ............... 715/757
6,437,778 B1 * 8/2002 Matsui et al. ................ 345/419
6,552,721 B1 * 4/2003 Ishikawa .................... 715/848
6,584,376 B1 * 6/2003 Van Kommer .............. 700/245
2002/0136167 A1 * 9/2002 Steele et al. ................ 370/260

FOREIGN PATENT DOCUMENTS

JP          09-081781          3/1997

* cited by examiner

Data transmission

Procedures in server PC 12

Processing by server PC
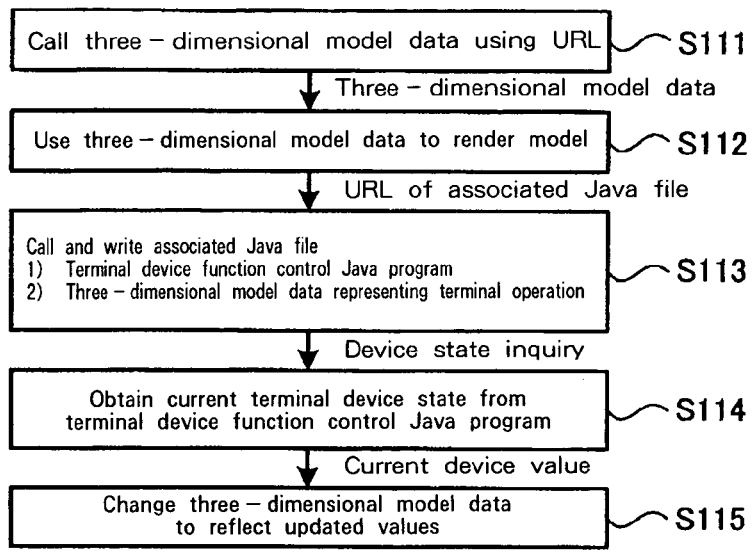
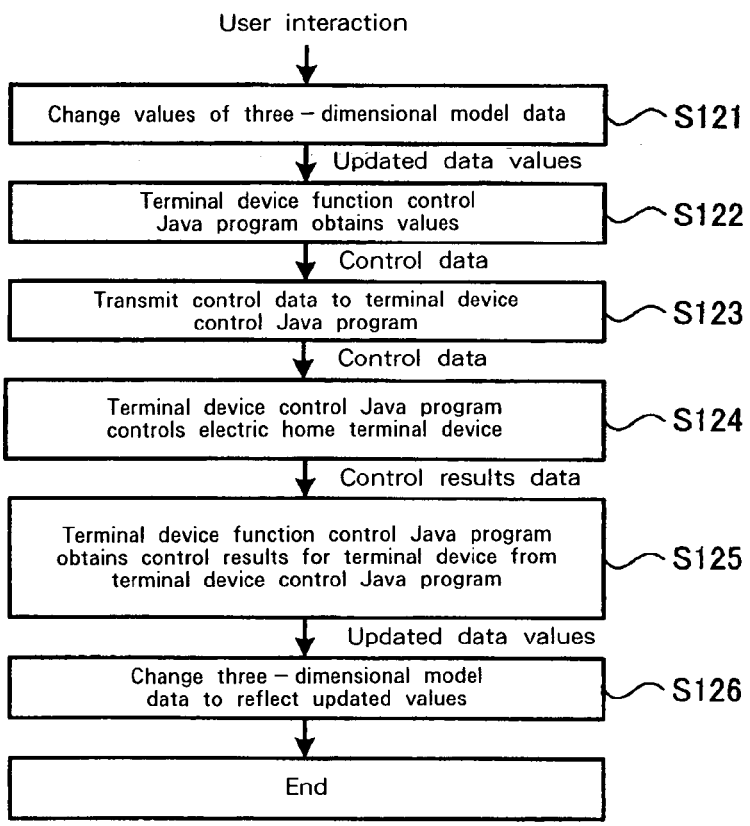
Fig. 7

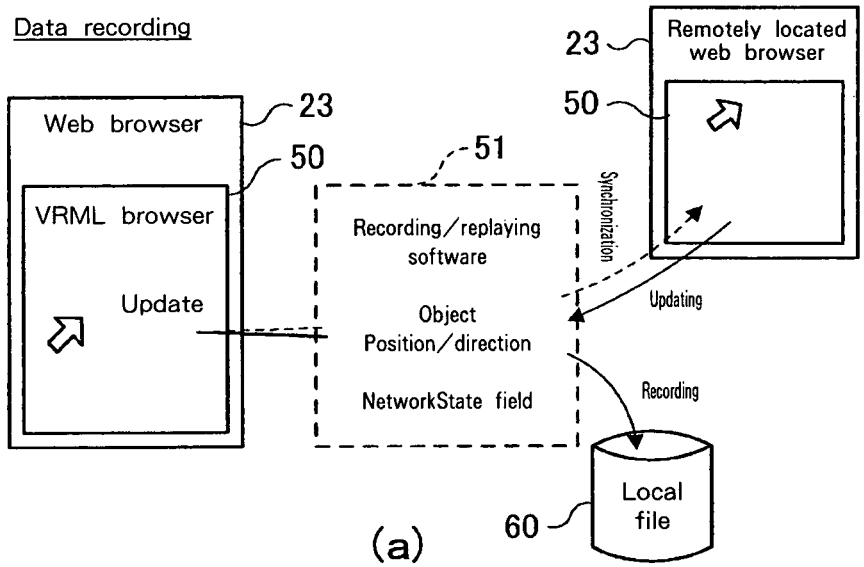
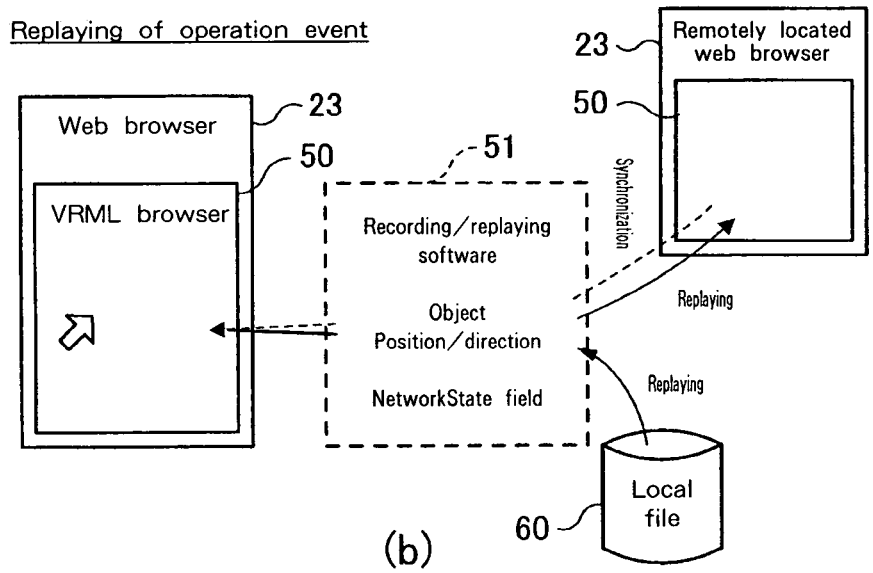
Fig. 15

REMOTE CONTROL SYSTEM, SERVER-CLIENT SYSTEM, SERVER FOR CONTROLLING TERMINAL DEVICE, TERMINAL DEVICE OPERATING METHOD, DEVICE INFORMATION SHARING METHOD, STORAGE MEDIA, AND PROGRAM TRANSMISSION APPARATUS

PRIOR FOREIGN APPLICATION

This application claims priority from Japanese patent application number 11-324672, filed Nov. 15, 1999, which is hereby incorporated herein by reference in its entirety.

TECHNICAL FIELD

The present invention relates to a remote control system and a terminal device operating method for operating a terminal device, such as an electric home appliance, from a remote area, and for procuring a confirmation for the operation.

BACKGROUND ART

As the development of techniques for the use of electric home appliances and office equipment has progressed, these terminal devices have tended to become multi-functional and complex. Therefore, when the only references available are the operating manuals manufacturers usually provide, understanding these complicated terminal devices is a demanding task and ordinary users find them difficult to operate. As a result, the number of inquiries received by customer support centers is growing rapidly, and an overwhelming load, including the employment of additional workers for their customer support centers, has been imposed on the companies that produce the terminal devices.

In addition to the increase in the number of inquiries, another problem has arisen in that it is very difficult to use written or oral explanations to describe the locations and the manipulation of operating buttons and operating slides on terminal devices, such as electric home appliances. Even when the electric home appliances are those that are commonly used, it is very difficult to explain to users from remote areas, by phone, the manipulation of specific pieces. Accordingly, the time required to respond to individual inquiries has been extended, and this has imposed an immense load on customer service centers.

Furthermore, inquiries received from users involve not only simple part manipulations, but also operating problems, such as the malfunctioning of terminal devices. In such cases, customer support centers must specifically identify malfunctioning parts, and must, therefore, quiz users to determine how they used the terminal devices in the past, as well as ask the users to precisely describe the current condition of their malfunctioning unit. However, if the users are not fully familiar with the terminal devices, it is difficult for the persons in charge at the customer support centers to ascertain what actions were taken by the users in the past and to evaluate the problems that the users are presently having. Furthermore, since the users may not fully understand the technical terms used by the persons in charge at the customer support centers, they very often may simply give up and sign off their problems unresolved.

For the diagnosis of device failures, a remote failure diagnosis service has recently appeared. When this service is used, a diagnosis of the failure of a manufacturing device, such as an automatic lathe, or of OA equipment, such as a facsimile machine or a copier, employed by a user, is made at a remotely located service center, and a quick, troubleshooting process is performed. More specifically, a history of malfunction alerts or of the operation of a user's machine is stored in a service center file, and when a major problem occurs, a call is immediately initiated so that an error status report can be transmitted to the service center via telephone line.

If the machines involved are expensive and are shipped only in limited numbers, as are manufacturing machines such as automatic lathes, the individual machines can be separately connected to a service center. However, if apparatuses or operations to be used for connections to service centers are provided for all units in a group of mass produced apparatuses, such as electric home appliances, the increase in manufacturing costs will be too great, and the operation will also be extremely complicated. Furthermore, the current remote failure diagnosis service for OA equipment is maintained only at a level at which problems are diagnosed without user input being required. In other words, this service does not take into account the remote control of a terminal device and the transmission of operating instructions to a user.

Recently, "Jini" has been developed as a Java technique for the interconnection of different apparatuses, such as personal computers, AV apparatuses and electric home appliances, via a network. This software employs a distributed object technique that is being developed by Sun Microsystems, Corp., and is constituted by software that provides a function whereby objects can exchange messages using asynchronous communication procedures. "Jini" is being developed for use for establishing connections via a network consisting of various types of apparatuses having different processing speeds. However, "Jini" merely provides a method whereby apparatuses interconnected via a network can select themselves using Java code that is mounted, so that the apparatuses can mutually employ each other. A method whereby a server can control individual apparatuses is not taught in Jini. Thus, in order to simplify an explanation for an operation performed at a remote area and to easily exercise the remote control of a device, the problem of how to apply many techniques must be resolved.

SUMMARY OF THE INVENTION

To resolve the above shortcomings, it is one object of the present invention to eliminate the conventional difficulty encountered when written or oral words must be used in explanations given to describe operations, and to simplify such explanations that are transmitted from remote areas (e.g., by remotely located devices). It is another object of the present invention to share among a plurality of users (e.g., a client and a customer) the operation of a remotely located terminal device, and to share, as a three-dimensional model, the current state of the terminal device and the manipulation performed up to the current time, so that an operation involving multiple users can be smoothly implemented. It is an additional object of the present invention to apply a user's operation to a three-dimensional model, for example, for the transmission of the operating results obtained by a pertinent terminal device, so that remote control of the terminal device by the user is enabled. It is a further object of the present invention to record or replay interaction by a user as an operation log, so that a problem occurring at a terminal device can be rapidly and precisely understood.

To achieve the above objects, a remote control system according to the present invention comprises: a terminal device having a control program; a server connected to the terminal device, for transmitting control data and for registering three-dimensional model data concerning the terminal device; and a client connected to the server, for receiving the three-dimensional model data, wherein the client performs an additional operation upon the receipt of specific three-dimensional model data from the server, and transmits, to the server, update data for a three-dimensional model which is obtained by the additional operation, and wherein the server transmits, to the terminal device, the control data based on the update data for a three-dimensional model received from the client.

If the terminal device is a Jini compatible product, the terminal device can execute a Java program as the control program using a Java VM (Virtual Machine), which is an interpreter.

Based on the update data for a three-dimensional model received from the client, the server transmits operation control data to the terminal device, and the control program of the terminal device interprets the operation control data for the operation of the terminal device, and transmits, to the server, control data for reflecting the operating results. This configuration is preferable because the control data can be exchanged by the terminal device and the control Java program of the server that is connected via a network, and the operation of the terminal device and the confirmation of the operating results are available.

Further, based on the control data received from the terminal device, the server adjusts the three-dimensional model data to reflect the current state of the terminal device, and transmits the resultant three-dimensional model data to the client. This configuration is superior because the operating results can be reported to a remote client that is controlling the terminal device.

In addition, the three-dimensional model data that reflects the current state of the terminal device can also be transmitted to another client that is not actively exercising remote control. With this configuration, the current state of the terminal device can be shared with another client, such as a customer support center. Furthermore, when the three-dimensional model data in this embodiment are employed as a drawing for an on-line help manual, the three-dimensional model data can be used to set up hyperlinks in pertinent explanatory sentence portions in an on-line operating manual. With this configuration, an operation can be illustrated in 3-D merely by reading the three-dimensional data.

According to the present invention, a server-client system comprises: a server, in which are stored three-dimensional model data, consisting of a Java program file concerning a connected terminal device; a first client connected to the server via a network, for calling for and for displaying specific three-dimensional model data included in the three-dimensional model data that are stored in the server; and a second client connected to the server via the network, for employing a web browser to designate a URL for the specific three-dimensional model data that are called for by the first client, and for downloading and displaying the specific three-dimensional model data received from the server so as to share the specific three-dimensional model data with the first client. With this configuration, the three-dimensional model data stored in the server can be shared by the clients that are connected by the server. These clients include not only the user of the terminal product but also the person in charge at the terminal device maker.

The three-dimensional model data, which consists of the Java program file stored in the server, includes a program for controlling the terminal device, and the first and the second clients display the values of the three-dimensional model data to reflect the current control state of the terminal device. Then, the current state of the terminal device, which is controlled by the first client, can be employed in common by the second client. Specifically, one of the first and the second clients is a computer at a customer support center that supports the terminal device. Thus, the device control condition can be shared as three-dimensional model data by the user and the customer support center, and they can easily communicate with each other. As a result, for the user, the response time at the customer support center can be shortened.

A control server for a terminal device according to the present invention comprises: a terminal device function control program, for exchanging control data for a terminal device connected to an internal network and for controlling the functions of the terminal device; three-dimensional model data, including geometrical data for the terminal device and device operating data that are received by the terminal device function control program and reflect the operating results of the terminal device; and a module, for recording an operation performed by a user as an operation event and for replaying, as needed, the operation event. The thus arranged server can record, in a log, the operations performed by a user. It is preferable that the client at the customer support center employ the record of the operations because then, based on operations previously performed by the user, he or she can appropriately cope with a problem.

The module can employ recording/replaying software to record, as a VRML (a Virtual Reality Modeling Language: the language used to write three-dimensional computer graphics treated in the Internet) operation event, an operation performed by a user that is generated via a VRML browser, and can replay and display the VRML operation event via the VRML browser. That is, an operation performed by the user is represented by the performance of an operation based on VRML contents, which are three-dimensional model data written for the VRML browser using a VRML format.

The control server further comprises: a client connected to an external network; and a module for exchanging an operation event with the client via the external network. Thus, the record of the user's operations in the log can be provided for the client connected to the external network. As an example application for which this configuration is used, even when during the processing a user forgets what actions are to be taken, the data recorded in the operation log and the current state of the product can be obtained by a client at a remote customer support center.

According to the present invention, a terminal device control method whereby a client exercises remote control of a terminal device comprises the steps of: designating a web browser at the client to designate a URL corresponding to the terminal device, and downloading three-dimensional model data; rendering the three-dimensional model data that are downloaded, and reading a control program that is correlated through the designation of the URL; and transmitting operation control data to the terminal device in response to an operation where a user performs with the three-dimensional model that is rendered by the client.

The step of transmitting the operation control data to the terminal device includes the steps of: transmitting, to a server, the updated value of the three-dimensional model data obtained by the client; and employing the updated value to transmit the operation control data from the server to the terminal device.

The terminal device control method further comprises the steps of: transmitting control data for reflecting operating results from the terminal device to the server; and reflecting the control data to the three-dimensional model data, and transmitting the resultant three-dimensional model data from the server to the client.

According to the present invention, a terminal device sharing method, for sharing among a plurality of clients information concerning a terminal device, comprises the steps of: employing a web browser at a first client to designate a URL corresponding to the terminal device, and downloading model data; rendering the model data that are downloaded; preparing shared data by operating the model data that are rendered by the first client, and transmitting the data used in common; employing a web browser of a second client to designate a URL corresponding to the terminal device, and downloading model data; and receiving the data used in common from the first client and employing the data used in common to update the values of the model data. With this configuration, instead of having to struggle to use written or oral words to try to explain an operation, remote control can be exercised over the actual product by employing a three-dimensional model having the same geometrical shape.

According to the present invention, storage media are provided on which a computer stores a computer-readable program that permits the computer to perform: a process of calling for three-dimensional model data concerning a terminal device connected to a network; a process of rendering the three-dimensional model data that has been called for; a process of calling for a control file associated with the three-dimensional model data; and a process of receiving control data from the terminal device and of reflecting the received control data to the three-dimensional model data.

The computer-readable program further comprises: a process of receiving updated values of three-dimensional model data from a client connected to an external network, and of transmitting the control data to the terminal device.

According to the present invention, storage media are provided on which a computer stores a computer-executable program that permits the computer to perform: a process of calling for the transmission, via an external network, of three-dimensional model data concerning a terminal device; a process of rendering the three-dimensional model data that is called for; a process of calling for a control file associated with the three-dimensional model data; a process of reflecting the control file to values of the three-dimensional model data; and a process of changing the values of the three-dimensional model data based on the operation for the three-dimensional model. The storage media are, for example, CD-ROMs or floppy disks, but another type of storage media may be employed.

According to the present invention, a program transmission apparatus comprises: storage means for storing a program that executes a process of calling for the transmission, via an external network, of three-dimensional model data concerning a terminal device, a process of rendering the three-dimensional model data that has been called for, a process of calling for a control file associated with the three-dimensional model data, a process of reflecting the values in the control file to the values of the three-dimensional model data, and a process of changing the values of the three-dimensional model data based an operation performed by a user for the three-dimensional model; and transmission means for reading the program from the storage means and for transmitting the program to an external computer. In this configuration, a case is included wherein the program is transmitted to a personal computer (PC) that implements the present invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 7 is a flowchart showing the processing performed by the server PC 12 when the terminal device is operated using a three-dimensional model;

FIGS. 15A and 15B are diagrams for explaining the schematic configuration for recording data and for replaying an operation event.

DESCRIPTION OF THE SYMBOLS

Figure 1:
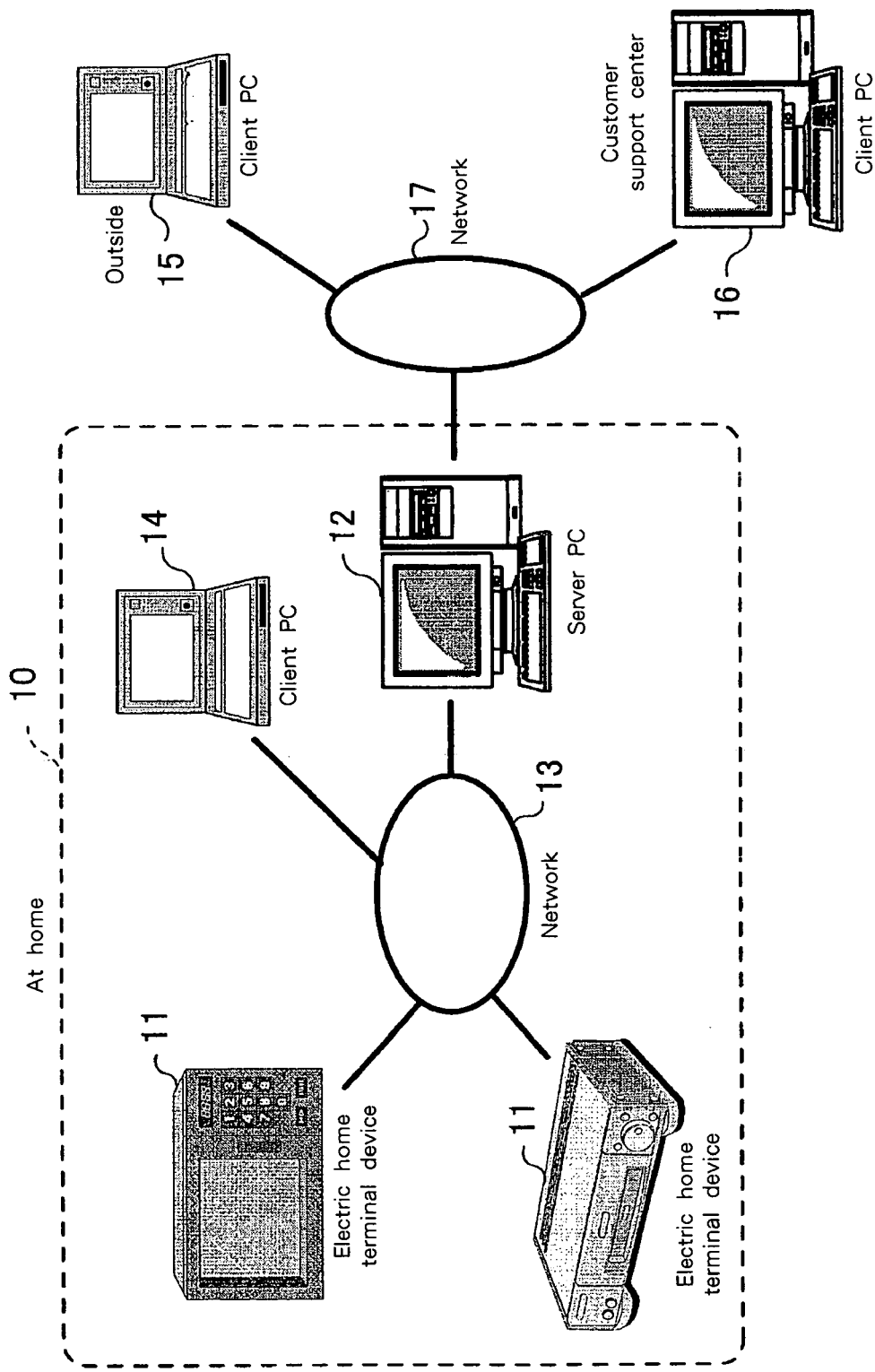
FIG. 1 is a diagram showing a hardware system configuration according to one embodiment of the present invention.

11: Electric home terminal device
12: Server PC
13: Network
14, 15, 16: Client PC
17: Network
21: Java VM
22: Terminal device control Java program
23: Web browser
24: Three-dimensional model rendering browser
25: Terminal device function control Java program 26: Three-dimensional model data include the device shape and device operation data (Three-dimensional model data)
27: On-line help text file
28: Three-dimensional model sharing client
29: Three-dimensional model sharing server
31: Media
50: VRML browser
51: Recording/replaying software
52: Communication module
61: VRML file
62: Text file

BEST MODE FOR CARRYING OUT THE INVENTION

FIG. 1 is a diagram showing the hardware configuration of a system according to the preferred embodiment. In a home network system 10 in FIG. 1, an electric home terminal device 11, such as an electric home appliance, a server PC 12 and a local client PC 14 are interconnected via an internal network 13, such as an Internet. The server PC 12 is also connected, via an external network 17, such as the Internet, to a remote client PC 15 and a client PC at a customer support center.

The electric home terminal device 11 is compatible with Jini, on which the Java VM (Java Virtual Machine) runs, and exchanges control data with the server PC 12. The control data includes data for operating the electric home terminal device 11 and data that reflect the results of an operation. The server PC 12 also exchanges, with the client PCs 14, 15 and 16, data used in common for three-dimensional models.

Figure 2:
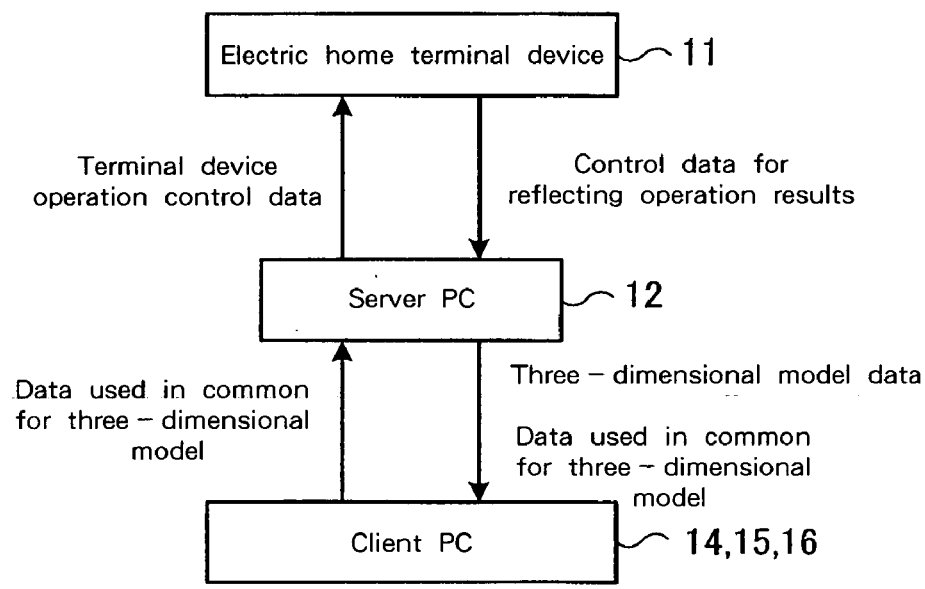
FIG. 2 is a schematic diagram showing the transmission of data in the hardware configuration.

FIG. 2 is a schematic diagram showing the transmission of data in the hardware configuration. The client PCs 14, 15 and 16 call for one of the three-dimensional model data sets that are registered in the server PC 12. The operations performed by the client PCs 14, 15 and 16 reflect the data used in common for three-dimensional models that is provided for the server PC 12. Upon receiving this data, the server PC 12 transmits to the electric home terminal device 11, via the network 13, the operation control data, and as a result, remote control exercised by the client PCs 14, 15 and 16 is implemented. The results provided by the remote control operation are transmitted by the electric home terminal device 11 to the server PC 12 as control data for reflecting operation results, and are then transmitted by the server PC 12 to the client PCs 14, 15 and 16 as data used in common for three-dimensional models.

The software configuration for this embodiment will now be described.

Figure 3:
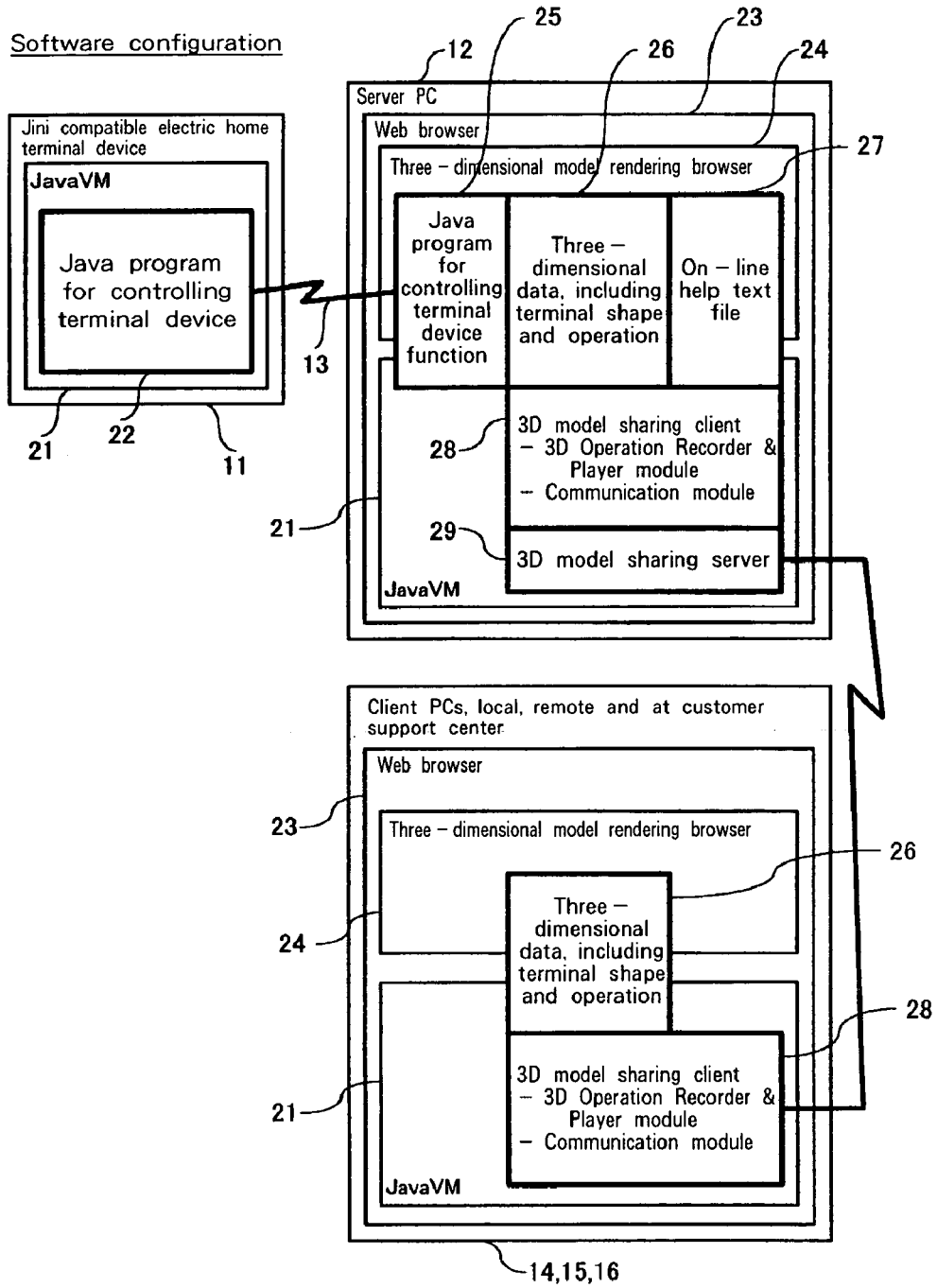
FIG. 3 is a diagram showing the software configuration according to the embodiment.

FIG. 3 is a diagram showing the software configuration according to this embodiment. A Java VM 21 is a Java Virtual Machine that permits a Java program to be run on the Jini compatible electric home terminal device 11. This software is provided as an execution environment for the server PC 12, the local client PC 14, the remote client PC 15 and the client PC 16 at the customer support center.

A Java program 22 for controlling a terminal device is an executable file that is run in the Java VM 21 on the Jini compatible electric home terminal device 11. The Java program 22 exchanges control data, via the network 13, with a Java program 25, in the server PC 12, that controls a terminal device function, which will be described later. Based on the received control data, the Java program 22 controls the electric home terminal device 11, and transmits the results to the server PC 12.

A web browser 23 is a WWW browser that is operated by the server PC 12 and the client PCs 14, 15 and 16, and this executable module supports the function for processing the Java program (Java VM function). For example, the Communicator, a Netscape Corp. product, or the Internet Explorer, a Microsoft Corp. product, can be used as such a web browser.

A three-dimensional model rendering browser 24, which is an executable module, is provided for the server PC 12 and the client PCs 14, 15 and 16 as a web browser 23 plug-in, and supports the function for reading three-dimensional model data and rendering a three-dimensional model (a Java VM function). The three-dimensional model rendering browser 24 interacts with the web browser 23 to support the function for processing the Java program, and corresponds, for example, to the WorldView VRML browser, by InterVista Corp. The web browser 23 and the three-dimensional model rendering browser 24 need not be separate software; the two can be replaced by a single browser that supports both functions.

A Java program 25 for controlling a terminal device function is provided for the server PC 12, and is executed in order to control the function of the electric home terminal device 11 using three-dimensional model data 26, which include terminal device geometrical shape data and operation data both of which are displayed by the three-dimensional model rendering browser 24. The terminal device function control Java program 25 exchanges control data, via the network 13, with the terminal device control Java program 22. More specifically, the Java program 25 transmits the operation control data for controlling the function of the electric home terminal device 11, receives control data for reflection of operation results, and reflects the received results to the three-dimensional model data rendered by the three-dimensional model rendering browser 24. The three-dimensional model data 26, which include the device shape and device operation data, are stored in the server PC 12 and the client PCs 14, 15 and 16, and are displayed by the three-dimensional model rendering browser 24. The three-dimensional model data 26 is constituted, for example, by a Java program file and a VRML (Virtual Reality Modeling Language) file.

An on-line help text file 27 is provided for the server PC 12 and is connected by hyperlinks to the individual portions of the three-dimensional model data. The on-line help text file 27 is, for example, a web page that is written in HTML to explain the individual sections of the three-dimensional model, i.e. the terminal device. When a user clicks on a portion of the three-dimensional model, an explanation for the specified portion is displayed on the web browser 23.

A three-dimensional model sharing client 28 is provided in the server PC 12 and the client PCs 14, 15 and 16, and is constituted by a 3D Operation Recorder and Player module and a communication module. The communication module exchanges, via the networks 13 and 17, the data used in common for three-dimensional models (change data and update data used in common) with the three-dimensional model sharing server module in a three-dimensional model sharing server 29, which will be described later. The communication module also receives three-dimensional model data via the networks 13 and 17 from the HTTP server module of the three-dimensional model sharing server 29. The 3D Operation Recorder and Player module will be described later.

The three-dimensional model sharing server 29 is provided in the server PC 12, and is constituted by the three-dimensional model sharing server module, the HTTP module, and a Jini lookup server module. The three-dimensional model sharing server module exchanges data used in common, via the networks 13 and 17, with the communication module of the three-dimensional model sharing client 28. The HTTP server module transmits the three-dimensional model data, via the networks 13 and 17, to the communication module of the three-dimensional model sharing client 28, and transmits, to the client PCs 14, 15 and 16, the three-dimensional model data that are stored in the three-dimensional model sharing client 28 and the three-dimensional model rendering browser 24. The Jini lookup server module registers and manages, via the network 13, the Jini compatible electric home terminal device 11.

Figure 4:
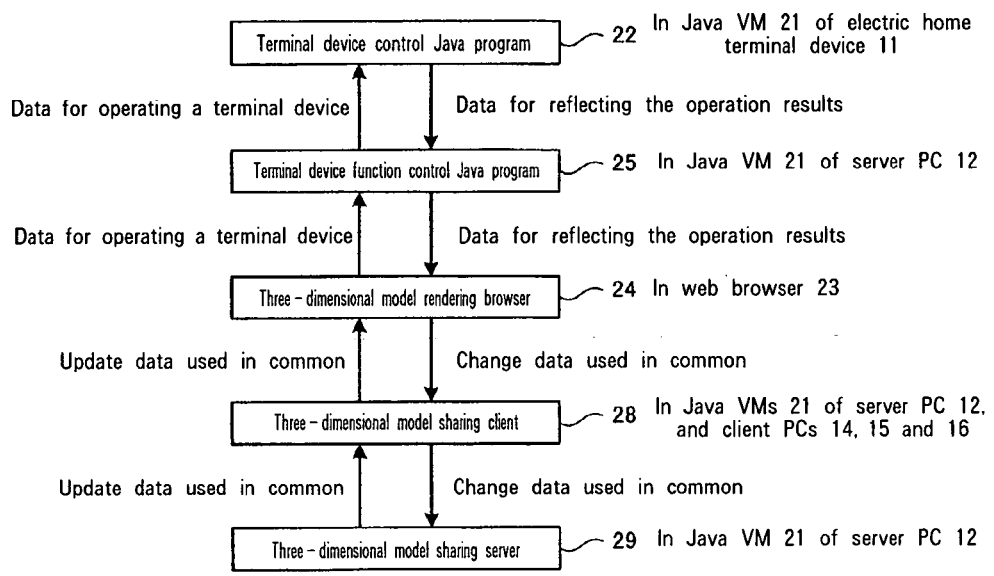
FIG. 4 is a diagram for explaining the transmission of data in the software configuration.

The data transmission by the above described software is shown in FIG. 4.

The data for operating a terminal device and the data for reflecting the operation results are exchanged by the terminal device control Java program 22 (in the Java VM 21 of the electric home terminal device 11) and the terminal device function control Java program 25 (in the Java VM 21 of the server PC 12). Similarly, the terminal device operation data and the operation result reflection data are exchanged by the terminal device function control Java program 25 and the three-dimensional model rendering browser 24 (in the web browser 23). The update data and change data that are used in common are exchanged by the three-dimensional model rendering browser 24 and the three-dimensional model sharing client 28 (in the Java VMs 21 of the server PC 12, the client PCs 14, 15 and 16). Similarly, the update data and change data that are used in common are exchanged by the three-dimensional model sharing client 28 and the three-dimensional model sharing server 29 (in the Java VM 21 of the server PC 12).

The procedures in this embodiment are sorted into (1) data registration, (2) terminal operations using three-dimensional models, (3) terminal operations in remote areas using three-dimensional models, and (4) terminal operations originating at customer support centers using three-dimensional models. Each of these procedures will now be described in detail while referring to the flowcharts and other drawings.

(1) Data Registration

Figure 5:
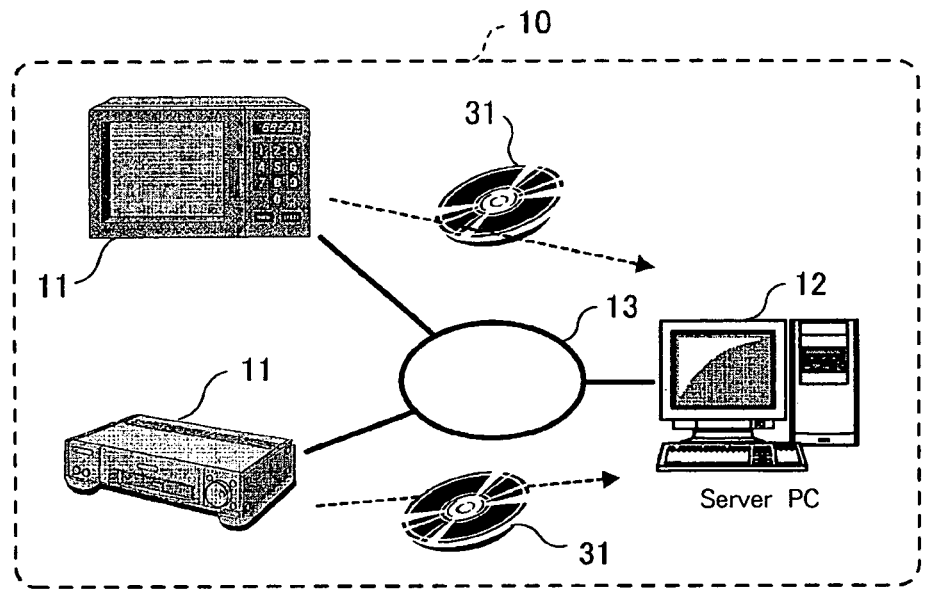
FIG. 5 is conceptual diagram for explaining the state when data are registered.

The data registration process will now be described while referring to the conceptual diagram in FIG. 5 and the flowchart in FIG. 6.

To newly connect the electric home terminal device 11 to the network 13, a three-dimensional model data file (e.g., a VRML file), which includes the operation data and the three-dimensional geometrical shape data of the terminal device 11, and a Java program file are registered to the server PC 12. The Java program includes the terminal device control Java program 22 and the terminal device function control Java program 25. As is shown in FIG. 5, the three-dimensional model data and the Java programs are registered to the server PC 12 via media 31 (e.g., CD-ROMs or magnetic media) that are provided with a product from the maker of the electric home terminal device 11.

Figure 6:
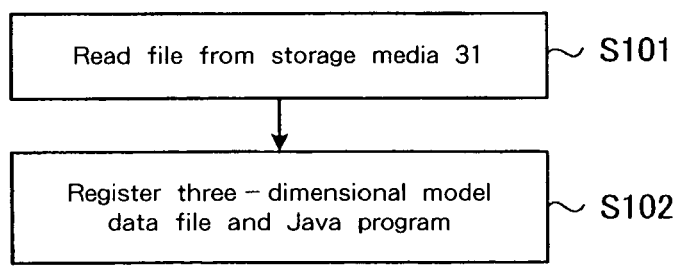
FIG. 6 is a flowchart showing the processing performed by the server PC 12 when the data are registered.

FIG. 6 is a flowchart showing the processing performed by the server PC 12. The server PC 12 reads a file from the media 31, such as CD-ROMs (step 101). Then, the server PC 12 registers the three-dimensional model data file and the Java programs by, for example, storing them in the HTTP server module (step 102). At this time, the file of the three-dimensional model data 26 that represents the three-dimensional geometrical shape and the operation is regarded as a main file, and a file for the terminal device function control Java program 25, which describes an act performed when the three-dimensional model is operated and the control provided for the terminal device 11, is designated a part of the main file (e.g., by the URL in the VRML file). In addition, the on-line help text file 27 can be hyperlink connected, as text for an operating manual, to the main file.

(2) Terminal Operation Using a Three-Dimensional Model

FIG. 7 is a flowchart showing the processing performed by the server PC 12.

First, the server PC 12 calls up the file of one of the three-dimensional model data sets that are registered (step 111). This call up is performed when the web browser 23 designates a URL that represents three-dimensional model data for a targeted device (data for the targeted electric home terminal device 11). This URL belongs to the HTTP server module in the same server PC 12, and is one of the registered data sets. Actually, the call up is performed by downloading data from the HTTP server module, and by reading a file using the VRML browser. Then, the three-dimensional model data are used by the VRML browser to render a three-dimensional model (step 112). That is, the three-dimensional model rendering browser 24 renders the shape represented by the three-dimensional model data in the file that is called up. At the same time as the shape is being rendered, an associated Java file is called and read (step 113). That is, the terminal device function control Java program 25 associated with the designation of the URL and the file of the three-dimensional model data 26 representing the device operation are read, for example, by the VRML browser, and are executed by the Java VM 21. At this time, the state of the Jini compatible electric home terminal device 11 is obtained by the terminal device control Java program 22, and is transmitted to the terminal device function control Java program 25 of the server PC 12 using, for example, Java RMI (Remote Method Invocation) communication. Thus, the current state of the electric home terminal device 11 is obtained by the terminal device function control Java program 25 (step 114). Further, the current state of the electric home terminal device 11 is reflected, via the terminal device function control Java program 25, by the three-dimensional model rendered by the three-dimensional model rendering browser 24 (step 115). More specifically, the VRML-Java API(JSAI) is employed, and a rendering process using the VRML browser is performed.

An explanation will now be given for a case wherein user interaction occurs at the server PC 12. Here, a user performs an operation with the three-dimensional model that is displayed, and changes the values of the three-dimensional model data (step 121). When, for example, a VRML event has occurred as a result of an action taken by a VRML browser, the terminal device function control Java program 25 employs the VRML-Java API to obtain the updated data values (step 122). The terminal device control Java program 22 of the electric home terminal device 11 is notified, via, for example, Java RMI communication, of the updated values that are transmitted as control data (step 123). Upon the receipt of the control data, the terminal device control Java program 22 assumes control of the Jini compatible electric home terminal device 11 (step 124). Then, via Java RMI communication, the terminal device function control Java program 25 of the server PC 12 obtains the control results for the electric home terminal device 11 from the terminal device control Java program 22 (step 125). The obtained control data are used by the VRML browser that employs the VRML-Java API (JSAI) to re-render the three-dimensional model to reflect the updated data values (step 126). As is described above, based on the control data, which are fed back in reverse order by the Java program and reflect the results of the operation, the remote control results can be provided as the current state of the three-dimensional model on the display of the three-dimensional model rendering browser 24 of the server PC 12. When the display of the three-dimensional model is terminated, the operation of the three-dimensional model rendering browser 24 is also terminated, and the three-dimensional model and the current state are deleted from the memory.

The three-dimensional model, which is displayed by the three-dimensional model rendering browser 24 of the server PC 12, is operated by a user in consonance with explanatory sentences that are provided as on-line help, and in accordance with the method of the invention, the user's operation is transmitted to the electric home terminal device 11 to perform the remote control function. As a result, the operation can be performed more simply than when a conventional operating manual is used.

Figure 8:
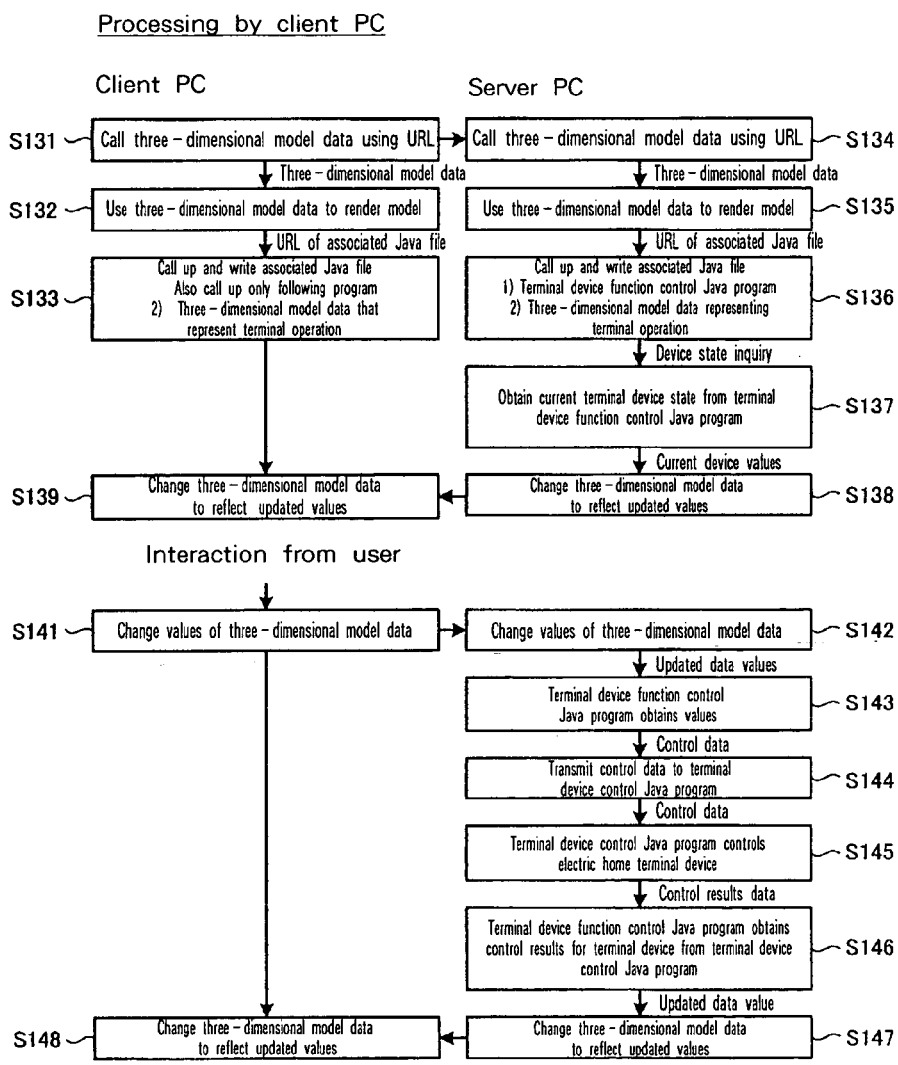
FIG. 8 is a flowchart showing the processing performed by the client PCs 14 and 15.

(3) Terminal Operation Performed at a Remote Area using a Three-Dimensional Model FIG. 8 is a flowchart showing the processing performed by the client PC 14 or 15. The processing performed by the client PC at the customer support center will be described later. First, the client PC 14 or 15 at a remote area calls up a file containing three-dimensional model data (step 131). In this process, the web browser 23 of the client PC 14 or 15 at the remote area designates a URL that corresponds to the target terminal device 11, and downloads the three-dimensional model data file to the client PC 14 or 15. The designated URL points to data that was previously registered at the server PC 12. The three-dimensional model data file that is downloaded to the client PC 14 or 15 is read by the three-dimensional model rendering browser 24, and is used to render the shape that it describes (step 132). A Java program file associated with the designated URL is also called up (step 133). During this processing, only the program for the three-dimensional model data 26 including the device operation is called up. To share the three-dimensional model data 26, this data is written in a three-dimensional model data file used in common (e.g., a VRML file employing the LivingWorlds node), and the Java program that is read is executed by the Java VM 21 of the client PC 14 or 15.

Since the three-dimensional model data file is called up (step 134), the three-dimensional model rendering browser 24 of the server PC 12 automatically reads and renders the three-dimensional model data (step 135), so that the same three-dimensional model is shared by the client PC 14 or 15 that called up the three-dimensional model data file. The Java program files (the terminal device function control Java program 25 and the three-dimensional model data 26, which include the device operation) associated with the three-dimensional model data as a result of the URL designation are also called up (step 136). Then, the three-dimensional model values that reflect the current state of the electric home terminal device 11 are obtained by the terminal device function control Java program 25 (step 137). The current state of the terminal device 11 is thereafter reflected in the three-dimensional model rendered by the three-dimensional model rendering browser 24 of the server PC 12 (step 138). Since the three-dimensional model is shared with the client PC 14 or 15, the same current device state is used for the three-dimensional model rendered by the three-dimensional model rendering browser 24 provided for the client PC 14 or 15 (step 139). Thus, the three-dimensional models displayed by the server PC 12 and the client PC 14 or 15 reflect the same state.

The alteration of the data value in one client PC is reported, via the server PC 12, to another client PC, and the three-dimensional model is therefore used in common by all these clients at the time at which it is read.

An explanation will now be given for a case wherein user interaction has occurred at the client PC 14 or 15. When a user changes the values of the three-dimensional model data on a display (step 141), this alteration is reflected, via the three-dimensional model used in common, by the three-dimensional model displayed by the server PC 12 (step 142). The updated data values are obtained by the terminal device function control Java program 25 provided for the server PC 12 (step 143), and thereafter, the terminal device control Java program 22 at the electric home terminal device 11 is notified of the updated values by the transmission of control data using, for example, Java RMI communication (step 144). Upon the receipt of the control data, the terminal device control Java program 22 employs it to control the Jini compatible electric home terminal device 11 (step 145). In this manner, control data that is consonant with the replayed operation is transmitted by the server PC 12 to the electric home terminal device 11, and as a result, remote control of the terminal device is implemented. Then, by means of a Java RMI communication, the terminal device function control Java program 25 provided for the server PC 12 obtains the control results of the electric home terminal device 11 from the terminal device control Java program 22 (step 146). The obtained, updated data values are used by the VRML browser, which employs the VRML-Java API (JSAI), to re-render the three-dimensional model so that it reflects the control results (step 147). Then, since the three-dimensional model is shared with the client PC 14 or 15, the same current device state is also reflected by the three-dimensional models displayed by the client PC 14 or 15 (step 148). Therefore, the three-dimensional models at the server PC 12 and the client PC 14 or 15 reflect the same state.

Figure 9:
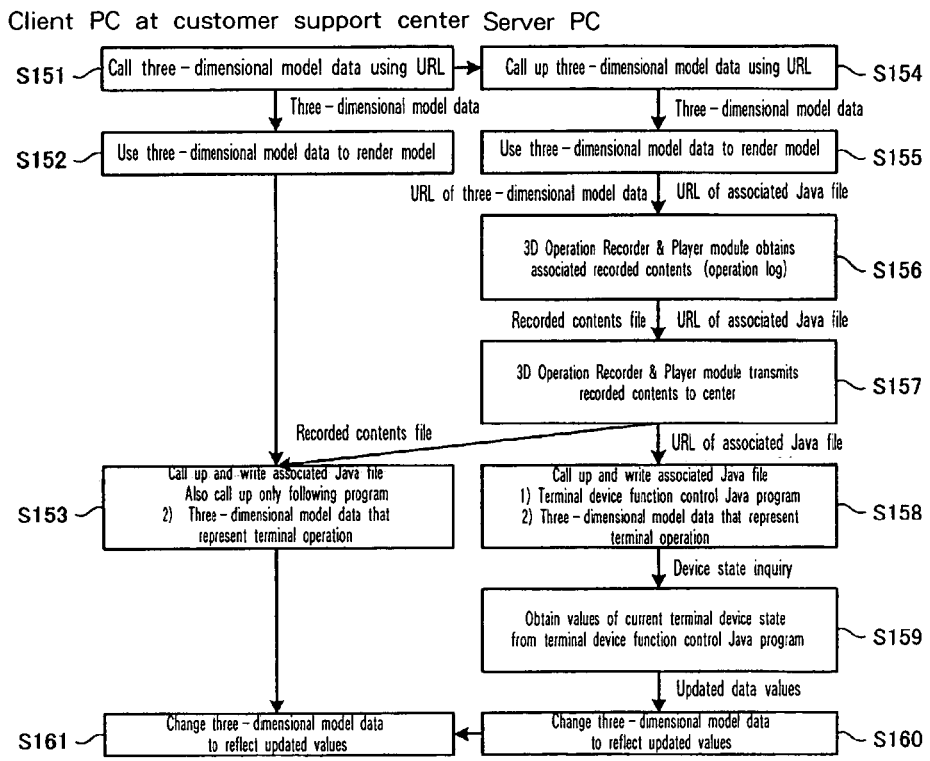
FIG. 9 is a flowchart showing the remote control operation of the terminal device performed by the client PC 16 at a customer support center.
Figure 10:
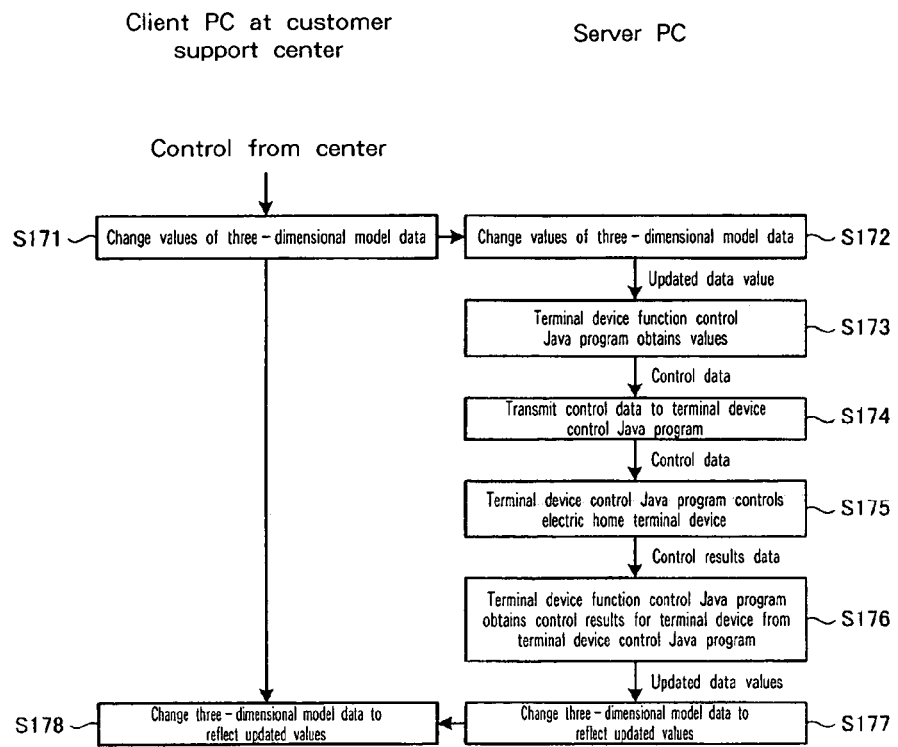
FIG. 10 is a flowchart of the processing performed when the remote control operation is continued by the customer support center.

(4) Terminal operation performed at a dustomer cupport Center Using a Three-Dimensional Model FIGS. 9 and 10 are flowcharts showing the terminal operations performed by a client PC 16 at a customer support center. Assume that a user of a client PC 14 or 15 shares a three-dimensional model with the remotely located customer support center, and displays the three-dimensional model by employing the same procedures as are described above. The user of the client PC 14 or 15 dials the customer support center and notifies the center which URL he or she entered to obtain a three-dimensional model data file. Thereafter, the customer support center employs the web browser 23 provided for the client PC 16 to call up the designated URL, and downloads the three-dimensional model data file (step 151). Then, the shape represented by the downloaded, three-dimensional model data file is rendered by the three-dimensional model rendering browser 24 run by the client PC 16 (step 152). Furthermore, the Java file associated with the designated URL is also read, and is executed in the Java VM 21 provided for the client PC 16 (step 153).

On the server side, the three-dimensional model data file is called up by the server PC 12 (step 154). Thus, the three-dimensional model rendering browser 24 automatically reads the same three-dimensional model data file and renders the same three-dimensional model (step 155) as does the browser employed by the client PC 16 at the customer support center. The 3D Operation Recorder and Player module of the three-dimensional model sharing client 28 obtains the associated contents that are recorded in an operation log (step 156). At this time, while the user's operation log file is available, the 3D Operation Recorder and Player module provided for the three-dimensional model sharing client 28 of the server PC 12 transmits the recorded contents to the client PC 16 at the customer support center (step 157). On the client side, the received contents file are read by the 3D Operation Recorder and Player module provided for the three-dimensional model sharing client 28 of the client PC 16. Further, the Java program files (the terminal device function control Java program 25 and the three-dimensional model data 26 that include the device operation) that are associated with the three-dimensional model data at the designated URL are also called (step 158). Then, in response to a device state query transmitted to the electric home terminal device 11, the current state of the terminal device 11 is obtained as three-dimensional model values by the terminal device function control Java program 25 (step 159), and the three-dimensional model rendering browser 24 uses these values to re-render the three-dimensional model so that it reflects the current state of the terminal device 11 (step 160). Since the three-dimensional model is shared by the client PC 16 and the server PC 12, the three-dimensional model displayed by the client PC 16 at the customer support center also reflects the current device state of the terminal device 11 (step 161).

At this time, while the current state of the electric home terminal device 11 is displayed as a three-dimensional model on the screen of the client PC 16 at the customer support center, the changes in the individual data values that have been recorded in the operation log of the user can be obtained as a recorded data file by the customer support center.

The customer support center can provide various services, such as analyzation of barriers and consulting, based on
  i) the current state of the electric home terminal device 11, which is reflected in the display of the three-dimensional model used in common;
  ii) the operation log that is replayed using a three-dimensional model and that is based on the recorded data;
  iii) other sources, such as inherent electric home terminal device 11 data obtained, using a specific protocol, from the terminal device function control Java program 25.

FIG. 10 is a flowchart showing the processing performed when the customer support center continues to exercise remote control of the electric home terminal device 11. This processing is effective, for example, when to resolve a problem the three-dimensional model is operated to control the electric home terminal device 11.

First, the three-dimensional model data values are changed under the control exercised by the user of the client PC 16 at the customer support center (step 171). Simultaneously, the same operation is reproduced, via the three-dimensional model used in common, on a three-dimensional model that is displayed on the screen of the server PC 12 (step 172). The updated data values are obtained by the terminal device function control Java program 25 of the server PC 12 (step 173), and are transmitted, via Java RMI communication, as control data to the terminal device control Java Program 22 of the electric home terminal device 11 (step 174). Thereafter, the terminal device control Java program 22 employs the control data to operate the Jini compatible electric home terminal device 11 (step 175). Then, via Java RMI communication, the terminal device function control Java program 25 of the server PC 12 obtains from the terminal device control Java program 22 the control results for the terminal device 11 (step 176). When the VRML browser, which uses the VRML-Java API (JSAI), re-renders the three-dimensional model, the obtained, updated data values are reflected to the three-dimensional model (step 177). Since the three-dimensional model is used in common, the current state of the same device is also reflected by the three-dimensional model displayed by the client PC 16 at the customer support center (step 178). Therefore, the same state is reflected by the two three-dimensional models.

Figure 11:
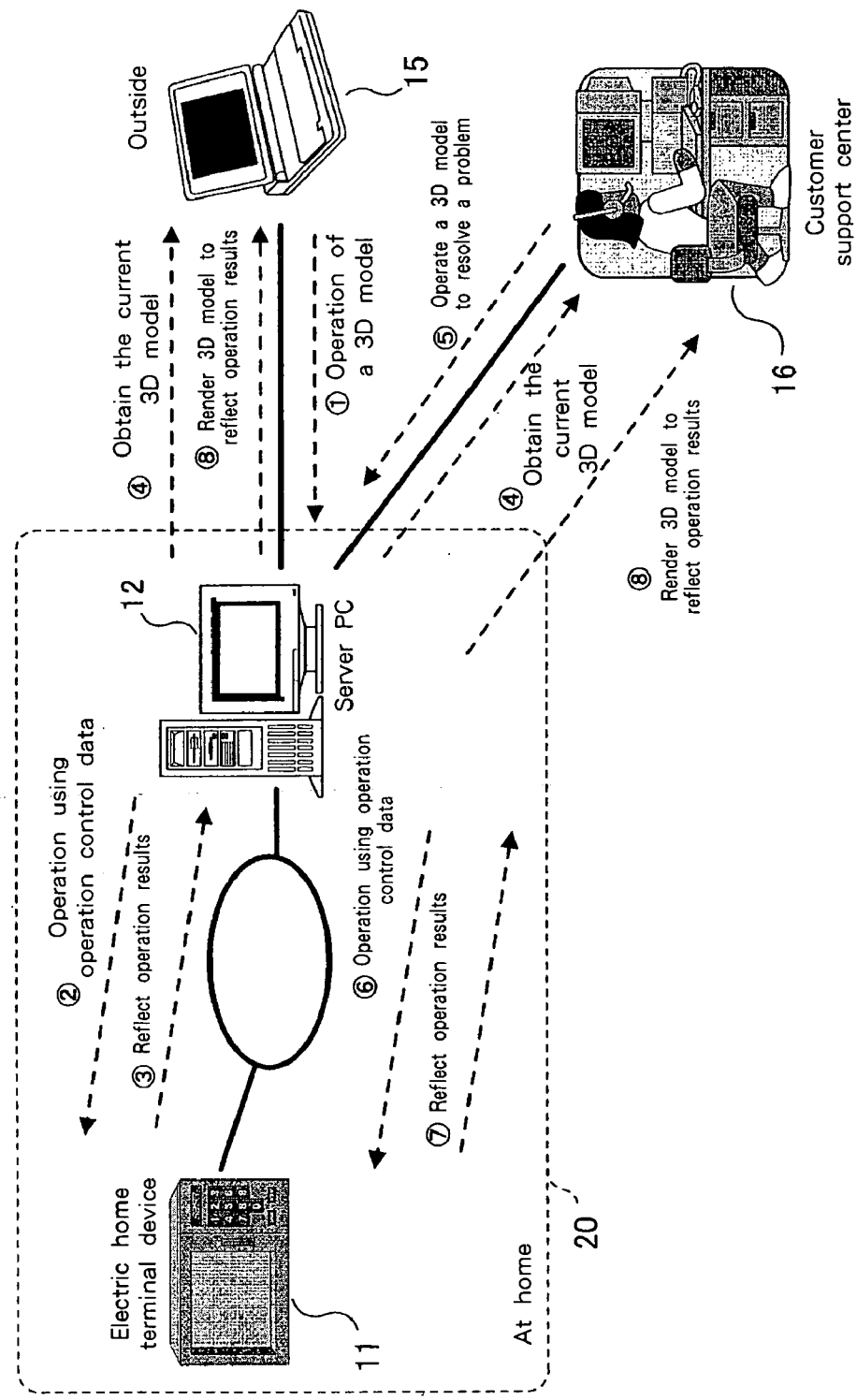
FIG. 11 is a diagram for briefly explaining the processing according to the embodiment.

FIG. 11 is a diagram for briefly explaining the above described processing performed in accordance with the embodiment.

When a remotely located client PC 15 performs "(1) an operation for a three-dimensional model," or via the electric home terminal device 11, "(2) an operation using operation control data" for the electric home terminal device 11 via the server PC 12, the operating state of the electric home terminal device 11 is transmitted as "(3) reflection of operating results" to the server PC 12. Thereafter, the reflection of the operating results is transmitted as "(4) acquisition of a current three-dimensional model" to the remotely located client PC 15 and to the client PC 16 at the customer support center. Then, when the client PC 16 at the customer support center issues "(5) an operation for the three-dimensional model to resolve a problem" to the server PC 12, the server PC 12 performs "(6) an operation using operation control data" for the electric home terminal device 11, and transmits the obtained results as "(7) reflection of operating results" to the server PC 12. Subsequently, the results are transmitted as "(8) a three-dimensional model reflecting the operating results" to the remotely located client PC 15 and the client PC 16 at the customer support center.

As is described above, according to the embodiment, since the client PCs 14 and 15 and the server PC 12 can share a three-dimensional model, the state of the three-dimensional model displayed on the screen of the client PC 14 or 15, i.e., the state of the terminal device that the user is currently employing, can be the same as the state of the three-dimensional model displayed on the screen of the client PC 16 at the customer support center. The client PCs can share the three-dimensional model, regardless of how many client PCs are involved.

In addition, in accordance with the current state of the three-dimensional model of the terminal device 11, the customer support center can continue the next operation for the three-dimensional model, or can analyze a barrier based on data contained in the user's operation log that is obtained and can transmit the results to the user. At this time, this notification is performed by voice transmission, which is not related to the method of this embodiment.

Furthermore, when the client PC 16 of the customer support center performs a succeeding operation for the three-dimensional model, since the three-dimensional model is shared, this operation not only controls the electric home terminal device 11 via the server PC 12, but also can be reproduced for the three-dimensional models displayed on the screens of the client PCs 14 and 15.

An explanation will now be given for the 3D Operation Recorder and Player module that is used by the three-dimensional model sharing client 28 according to this embodiment.

The 3D operation Recorder and Player module records/replays the operations performed by a user. That is, the 3D Operation Recorder and Player module enables the interaction of the three-dimensional model data using the VRML contents (three-dimensional model data written in VRML), and an automatic repetitive presentation for which only a browser is used. The user interaction that occurs via the VRML browser is recorded as a VRML operation event by the recording/replaying software and is replayed and displayed by the VRML browser. This method is used for the recording and the replaying of an operation event for the VRML contents, and is not used for the recording and the replaying of an operation event for the VRML browser and the web browser 23 for which a VRML browser is a plug-in.

Figure 12:
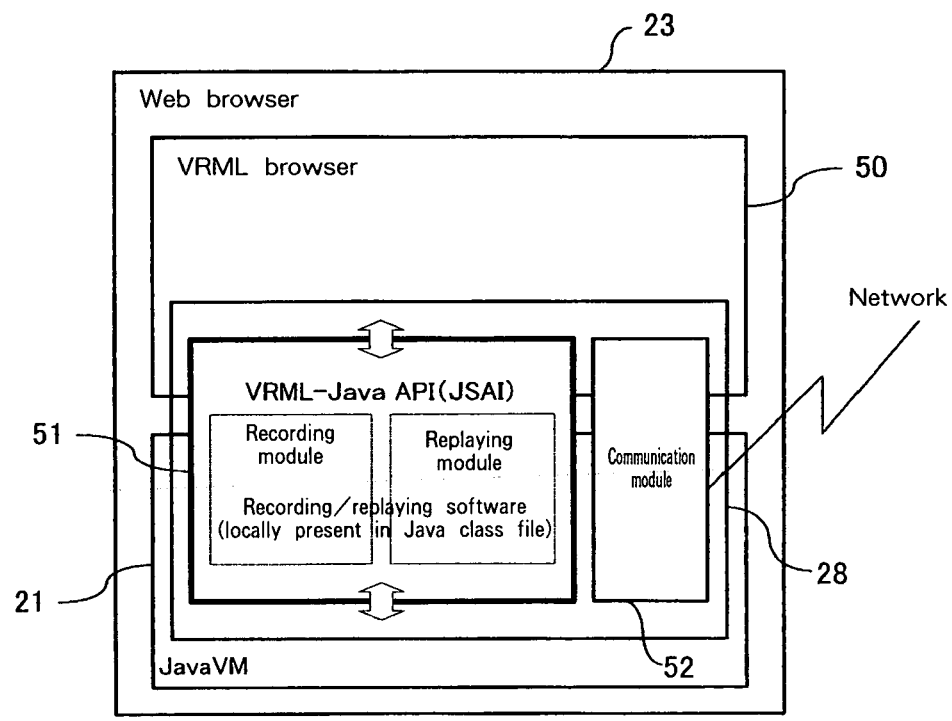
FIG. 12 is a diagram showing the software configuration in a 3D Operation Recorder and Player module.

FIG. 12 is a diagram showing the software configuration of the 3D Operation Recorder and Player module. In FIG. 12, the web browser 23 is a WWW browser that is run on a PC. A VRML browser 50, which corresponds to the above described three-dimensional model rendering browser 24, is an executable module as a plug-in for the web browser 23. The VRML browser 50 has a three-dimensional model rendering function and supports the VRML-Java API. The VRML browser 50 also interacts with the web browser 23 to support the function (Java the VM function) for processing Java programs. This VRML browser is, for example, the WorldView VRML browser, an InterVista Corp. product. The three-dimensional model sharing client 28 includes recording/replaying software 51 and a communication module 52. The recording/replaying software 51 is an executable Java program that includes an algorithm that will be described later. The recording/replaying software 51 is divided into a recording module and a replaying module and is run in the Java VM 21. To transmit an operation event to another PC, operation event data are transmitted to the communication module 52. The communication module 52 exchanges, via a network, the operation event data with the communication module of another PC.

Figure 13:
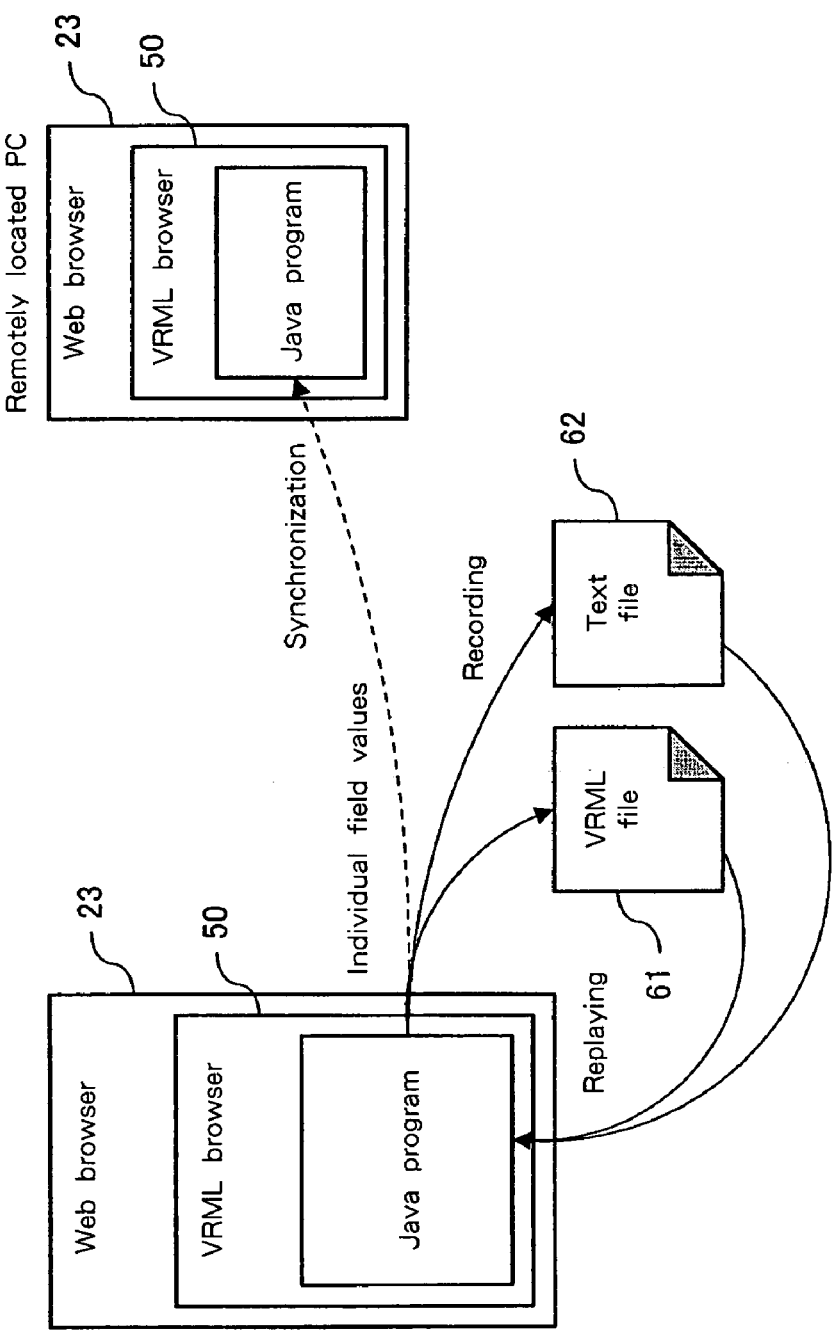
FIG. 13 is a schematic diagram showing a recording/replaying system using the 3D Operation Recorder and Player module.

FIG. 13 is a schematic diagram showing the configuration of a recording/replaying system that uses the 3D Operation Recorder and Player module.

In FIG. 13, a VRML file 61 is a storage file written in accordance with a specific format. In the VRML file 61, the "shape" represented by three-dimensional model data and information concerning the operation of a target terminal device are stored. A text file 62 is a file in which information concerning the operation of the target device terminal is stored. The information that is recorded concerns operations for changing the values of individual field types, except for SFNode and SFImage, which are used for the VRML contents (specifically, "position" and "orientation" field values for a "PrivateSharedObject" node, and a "value" field value for a "NetworkState" node). These operations include the changing of a URL, an adjustment of the position of an object, and the addition of text or another object. The operation information is stored either only in the VRML file 61 or in both the VRML file 61 and the text file 62. The VRML authoring tool or a text editor can be used to edit the operation information, which is displayed and replayed by the VRML browser 50.

Figure 14:
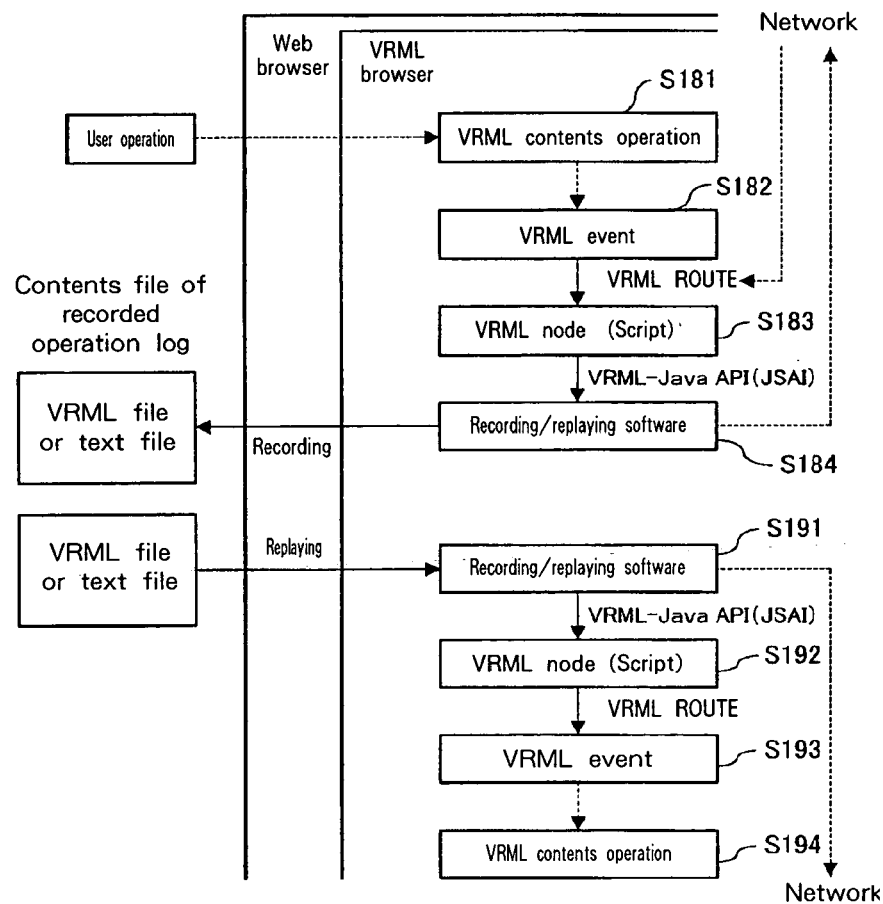
FIG. 14 is a flowchart showing data transmission using the 3D Operation Recorder and Player module.

The transmission of data using the 3D Operation Recorder and Player module will now be described while referring to the flowchart in FIG. 14.

The user's operation of the client PC 14 or 15 is represented by the operation of the VRML contents, such as grasping and operating an object displayed on the screen (step 181). The VRML contents are three-dimensional model data employed by the VRML browser 50, and are written in VRML. In order to interact with the recording/replaying software 51, the VRML browser 50 supports the VRML-Java API, whereby the VRML script node can be employed. Then, the operation of the VRML contents is obtained as a VRML event, such as position change (step 182). The VRML event is transmitted to the VRML node, which is an event receiver, and is converted into an appropriate form for transmission to the Java program (step 183). The VRML nodes used here are the PrivateSharedObject node and the NetworkState node, which are mounted by the Script node. The recording/replaying software 51 is executed by each Script node, while the data received from the VRML nodes are converted by the recording/replaying software 51 (step 184), and the resultant data are stored either only in the VRML file 61, or in both the VRML file 61 and the text file 62.

The sequence in which the replaying process is performed is the inverse of that employed for the recording process. Specifically, the data is read from the VRML file 61 or the text file 62 to the recording/replaying software 51 (step 191). The recording/replaying software 51 transmits the data, using the Java program form, to the VRML node (step 192), and the VRML node converts the data into a VRML event (step 193). Then, the VRML event is replayed as the operating form for the VRML contents (step 194).

The shape of the data that represents the three-dimensional position will now be specifically explained based on the VRML format of the ISO standard. An interpolator that will be described below presents, using a predetermined value, a general event that is represented by the ISO standards and that consists of a state change, such as a change in the position or the color of a cursor, or a change involving one fractional floating point, and stores the values in the VRML file 61. A movement, such as repetitive ON/OFF state changes, that is not defined by the interpolator is stored using a unique format in the VRML file 61 or the text file 62.

Assume that the SFFloat field value is to be recorded as a VRML event by a specific VRML node, and that as the time t is changed, the SFFloat field value v is changed as follows:

| time:        | t1 | t2 | t3 | t4 | t5 | ... | tn |
| ------------ | -- | -- | -- | -- | -- | --- | -- |
| field value: | v1 | v2 | v3 | v4 | v5 | ... | vn |

This change is recorded in the output VRML file 61 by the recording/replaying Java software using the ScalarInterpolator node that is a VRML interpolator node, as follows.

| ScalarInterpolator{ key | [0 | 0.1 | 0.25 | 0.31 | 0.4 | ... | 1.0] |
| --- | --- | --- | --- | --- | --- | --- | --- |
| keyValue | [v | v2 | v3 | v4 | v5 | ... | vn]} |

"key" indicates the sampling time when the total time measured from the start to the end is normalized as 1. "keyvalue" indicates the form (position, color, etc.) at the sampling time.

The field values that employ the interpolator nodes to record data in the VRML file 61 are SFColor, SFFloat, SFRotation, MFVec3f and FVec3f. These values respectively embody the interpolator nodes ColorInterpolator, ScalarInterpolator, OrientationInterpolator, CoordinateInterpolator and PositionInterpolator (the SFBool type employs the following TimeSensor node). The field values that can not employ the interpolator nodes are written, in their own formats, in the VRML file 61 or in the text file 62.

The recording/replaying Java software generates a sensor node, in addition to the interpolator node, to output data to the VRML file 61. In the VRML file 61, the sensor node records the times t1 and tn as follows, as the operation start time and the operation end time: TimeSensor [startTime t1 stopTime tn]

A change in the SFBool value is also not recorded by the interpolator node, but instead, is recorded by the TimeSensor node. This process employs the fact that the "is Active" field value is set to TRUE (replayed) at the operation start time due to the designation of the startTime field value, and that the "is Active" field value is set to FALSE (not replayed) at the operation end time due to the designation of the stop-Time field value. The combination of the interpolator node and the sensor node for replaying is as follows:

DEF SI ScalarInterpolator {key [0  0.1  0.25  0.31  0.4  . . . 1.0]
                          keyValue [v  v2  v3  v4  v5  . . . vn]}

DEF TS TimeSensor [startTime t1 stopTime tn]

ROUTE TS.fraction_changed TO SI.set_fraction

The change in the value stored by the interpolator SI is replayed by starting the sensor TS.

Figure 16:
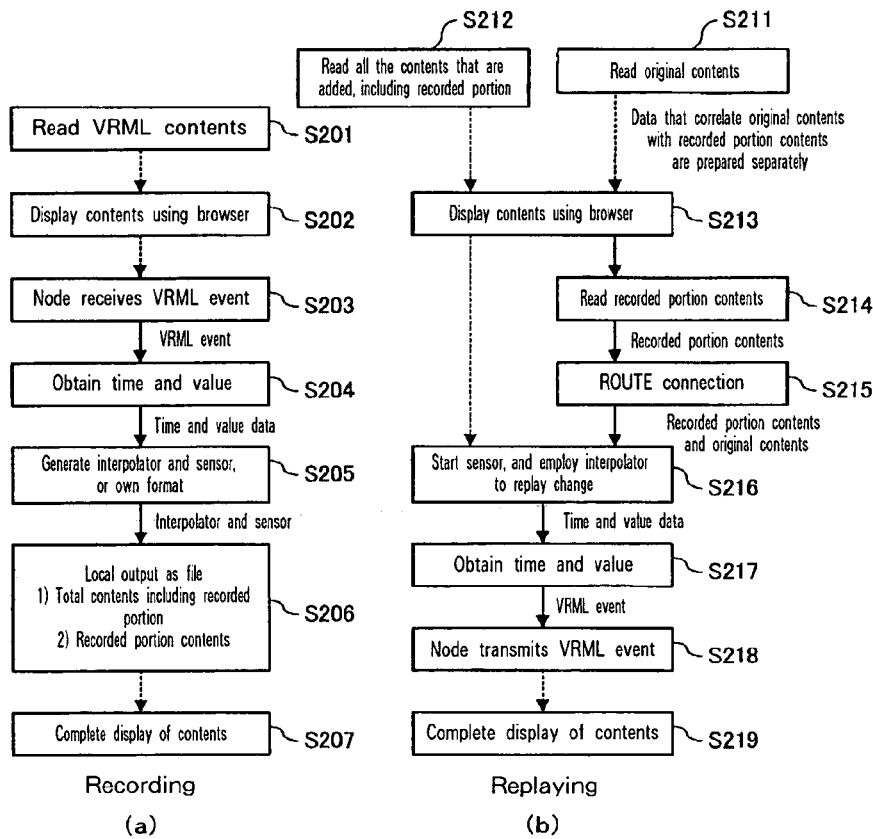
FIGS. 16A and 16B are flowcharts showing the processing performed by the recording/replaying software 51 during the recording and replaying process.

While referring to FIGS. 15A, 15B, 16A and 16B, an explanation will now be given for (1) data preparation, (2) data recording, (3) data reading, (4) and the replaying of an operation event. FIGS. 15A and 15B are schematic diagrams for explaining the configuration used for recording data and for replaying an operation event, and FIGS. 16A and 16B are flowcharts showing the recording/replaying processing performed by the recording/replaying software 51.

(1) Data Preparation

A VRML contents file, which holds three-dimensional model data, is a VRML form that includes a LivingWorlds node. This file is read by the VRML browser 50, the web browser 23 plug-in, and the three-dimensional model is displayed in the VRML browser 50 window. The recording/replaying software 51 is a Java program that is run in the Java VM 21 (see FIG. 12), while interacting with the VRML browser 50, and that is installed in a PC for which a web browser 23 is provided or to which one is downloaded via the network.

(2) Data Recording

The data recording process will now be described while referring to FIGS. 15A and 16A.

First, the recording/replaying software 51 reads the VRML contents (step 201) and displays them using the browser (step 202). Upon the receipt of an instruction from a user, or automatically, the recording/replaying software 51 begins to acquire an operation event, constituting a VRML event (step 203). The recording/replaying software 51 then records, with the time, changes in the "position" and "orientation" field values for the PrivateSharedObject node and the "value" field value for the NetworkState node that are designated in the VRML contents (step 204). During this processing, not only is an operation event by a local user (the user of the local machine) recorded, but in addition, an operation event received across the network is also recorded. The received operation events can be identified by using, as IDs, the URL of the file that includes the PrivateSharedObject node, the order of the PrivateSharedObject node in the pertinent file, and the tag field of the NetworkState node.

The recording/replaying software 51 transmits operation events, via the communication module 52 (see FIG. 12), to the network, as needed. When the recording/replaying software 51 of another computer receives an operation event via the communication module 52, and replays the event as the same operation (an updating of the same field value), the same contents changes as those effected on the operation event transmission side can be generated. In other words, synchronization can be obtained.

Upon the receipt of an instruction from the user, or automatically, the acquisition of an operation event is halted. The changes obtained for the time and the field values are converted into the interpolator and the sensor so that they may be recorded in the VRML file. The changes in the field values for which the interpolator node can not be used are stored using their own formats (step 205). The recording/replaying software 51 stores the accumulated data as VRML data with the text data in the VRML file 61 and the text file 62 (step 206). The data that are stored in the VRML file 61 concern SFBool, SFColor, SFFloat, SFRotation, MFVec3f and SFVec3f, and the changes to these values, together with the time, are written, by using the sensor node and the interpolator node, as the total contents (for step 212), including the contents of the recorded portion. The data for the field types are written, using their own formats, as the recorded portion contents (for step 214) in the text file 62. Through the above processing, the display of the contents during the recording process is terminated (step 207).

(3) Data Reading

As is shown in FIGS. 15B and 16B, first, when the data are written as the total contents, the recording/replaying software 51 reads the total contents that have been added, to include the recorded portion (step 212). Or, when the data are written as the recorded portion contents, the recording/replaying software 51 reads the original VRML contents (step 211). That is, the original contents file and the recorded portion contents file, in the text format used to record an operation event, are read (step 214). At this time, data that correlate the original contents with the recorded portion contents are separately prepared.

(4) Replaying of an Operation Event

The replaying of an operation event will now be described while referring to FIGS. 15B and 16B. The recording/replaying software 51 is in charge of replaying of the contents, as well as the management of time. First, the recording/replaying software 51 displays, using the browser, the contents that are read at step 211 or 212 (step 213). For partial data replaying, the recording/replaying software 51 reads the recorded portion contents in addition to the original contents (step 214). In order to indicate the relation existing between the partially read contents and the original contents, they are connected via a ROUTE, in accordance with the standard (step 215). To display these contents, changes in the data are replayed by the interpolator as the replaying operation is begun upon the start/stop of the sensor node (step 216). Then, the values of the output received from the sensor node and the interpolator node are obtained, along with the time that indicates what the value will be as time elapses (step 217). Then, the output of the sensor node and the interpolator node are applied as the changes for the values in the position and orientation fields of the PrivateSharedObject node and in the "value" field of the NetworkState node. As needed, the recording/replaying software 51 transmits the same operation event to the network via the communication module 52 (see FIG. 12) (step 218). The operation event received via the network is applied for the pertinent field, so that the automatic interactive replaying can be performed.

An example using this embodiment will now be described. As was previously described, when Java is installed in the Jini compatible electric home terminal devices 11, remote control can be exercised from the outside for these terminal devices 11 connected to the in-house network. The electric home appliance makers individually store three-dimensional models, which also include the operating systems for the products, in VRML files and Java files, and provide them on CD-ROMs. It should be noted, however, that the electric home terminal devices 11 need not always incorporate CD-ROM readers to read the CD-ROMs.

Each Jini compatible electric home terminal device 11 is identified via the network 13 by the server PC 12, which includes a Jini lookup server module and serves as a controller. All the connected Jini compatible electric home terminal devices 11 can be collectedly managed by the server PC 12.

Before returning home, after being absent for an arbitrary period of time, if a user desires to turn on a rice cooker, to start the recording of a TV program for which a video recording schedule was not set up, or to slightly open a small window to permit hot air to escape from a room, he or she can employ a remote client PC 15 to dial in, via a network, and establish a connection with the local server PC 12 at his or her home. Then, the user can call up whichever electric home terminal device 11 he or she wants to activate, and can use the method of this invention to exercise remote control of the selected device.

It is preferable that an operation target displayed on a screen during a remote control session be the same interface as a user employs to manipulate a product while present at a local site. And it is important that the user employ the same manipulation sequence, such as depressing switches in a specific order, on the three-dimensional model that is displayed on the screen of the remote client PC 15. That is, it is not preferable for a long explanatory sentence, or an operation panel that the user normally does not encounter at home, to be displayed by the remote client PC 15. This is because it is inappropriate for an individual, such as an elderly person, who is not especially skilled in the manipulation of devices at the local cite, to be forced to perform special operations that are required only when remote control is being exercised, and the performance of an unfamiliar activity may cause some confusion to such an individual.

As is described above, according to the present invention, during the exercise of remote control, a user can operate, on a screen, a three-dimensional model that has the same shape as an actual electric home appliance and that includes a VRML file having the same operating type. Since the three-dimensional model is so displayed on the screen that the results of an operation are reflected thereon, the user can confirm how the target device responds by moving or by opening. The data for the three-dimensional model are provided on a CD-ROM. A server PC 12 can fetch the data in advance, displays a series of operations via a user interface, and reflects only the results of the remote operation to the electric home appliance.

Next, assume that several family members operate electric home appliances while they are absent from home. When all family members are absent from home, and when one of them controls and operates a video recorder from a remote location, the control state must be constantly reflected by the displays available to the other users. Thus, the three-dimensional model used in common of this invention is employed, so that the three-dimensional models for all remote client PCs 15, and the local server PC 12, reflect the same operational states. And when a user forgets the remaining procedures for a device that is currently operated, he or she need only contact the remote client PC 16 at the customer support center of the maker of the device. The customer support center can then examine, via the server PC 12, the current state of the product, and can notify the user, who is employing a remote client PC 15, whether the state of the product is correct and whether the operation should be continued, while at the same time, the operating state of the device is displayed on the remote client PC 15 of the user. This function is also based on the employment of a three-dimensional model used in common of the present invention.

When the three-dimensional model is prepared and is provided as an on-line help manual, the user need not contact the client PC 16 of the customer support center, and can operate the three-dimensional model displayed by the local server PC 12, in accordance with the help instructions printed on the screen of the web browser 23.

The client PC 16 of the customer support center can obtain the user's operation log stored in the server PC 12, and can acquire data concerning the operating state before the inquiry was issued and frequent operations that seem to affect the usability. These data can be useful in reducing the time required to resolve a problem, and as a feedback for a product at the next stage.

As is described above in detail, according to the present invention, a three-dimensional model is employed to easily explain, for example, the positioning or the movement of an operating button or an operating slide of an electric home appliance that is generally difficult to explain for a user when only written or oral words are employed. That is, it is difficult to instruct a person by phone, from a remote location, how to operate an electric home appliance, even one that is in normal use, because the operation is not intuitive. However, according to this embodiment, not only written or oral words can be used, but also a three-dimensional model having the same geometrical shape as the actual product can be employed to control the product from a remote area, so that the difficulty encountered when using only written or oral words to explain an operation can be eliminated.

Furthermore, according to the present invention, the three-dimensional model can be shared by a plurality of users, and the operation can be visually experienced. In addition, the three-dimensional model that reflects the current product state can be shared not only with the user of the electric home appliance, but with the user and a person in charge at the customer support center of the electric home appliance maker. As a result, past operating conditions and instructions for the next operation can be exchanged by the user and the person in charge at the customer support center by using the three-dimensional model that has the same geometrical shape as the actual product. Therefore, when making an inquiry concerning a problem, the user can easily explain, to the person in charge at the customer support center of the product maker, what operations he or she performed.

In the above embodiment, an operation for which the three-dimensional model was used has been explained. However, the three-dimensional model can be replaced with a two-dimensional model, so long as the overall operation of the terminal device can be understood. Further, while in the explanation an electric home appliance was mainly employed as the terminal device, the present invention can also be applied for another terminal device, such as an office machine. In addition, not all the device terminals need be connected to a network; a remote control function may be removed; and information for a terminal device that is not connected to the network can be identified by using three-dimensional model data.

Further, the software that is used for the embodiment can be installed from storage media, such as CD-ROMs, in the server PC 12 and the client PCs 14, 15 and 16, and then executed. As an example mode, the server PC 12 installs the terminal device function control Java program 25, the three-dimensional model data 26, the on-line help text file 27, the three-dimensional model sharing client 28 and the three-dimensional model sharing server 29, which are the software described in detail while referring to FIG. 3. The software may be also stored in advance on storage media, such as hard disks.

The software may also be downloaded via the network, without requiring the use of storage media, such as CD-ROMs. In this case, storage means for storing a program and transmission means for reading and transmitting the program may be provided for the PC, and the program may be downloaded to the PC when a request is issued by a client PC 14, 15 or 16 that is connected to the Internet and that executes the program. The server PC 12 may include a function such as that provided by a program transmission apparatus, and the same program installation method as was used in this embodiment can be employed for the client PCs 14, 15 and 16 to form the client-sever system.

As is described above, according to the present invention, for a terminal device, such as an electric home appliance, a conventional difficulty can be eliminated that is encountered when written or oral words are used to explain operating procedures, and the procedures employed to explain operating procedures can be simplified.

Further, the operation of a terminal device can be used in common among a plurality of users in remote areas. The current state of the terminal device, including the results obtained by operations conducted with it, can be furnished the users by providing a display, for example, of a three-dimensional model used in common. In this fashion an operation in which multiple users participate can be smoothly initiated.

Furthermore, since the operation log of a user can be recorded or replayed, a problem arising in a terminal device can be rapidly and precisely diagnosed.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A remote control system comprising:
    a terminal device having a control program;
    a server coupled to said terminal device, said server configured to transmit control data to said control program for controlling said terminal device and register three-dimensional model data representing said terminal device; and
    a client coupled to said server, said client configured to receive and render said three-dimensional model data and to transmit to said server update three-dimensional model data for said rendered three-dimensional model data, said update data reflecting an operation on said rendered three-dimensional model data corresponding to an operation to be performed on said terminal device;
    wherein said server is further configured to receive said update data and transmit, in response to receiving said update data, corresponding operation control data to said control program in order to effect remote control of said terminal device by said client.

2. The remote control system according to claim 1, wherein said control program of said terminal device interprets said operation control data for said operation of said terminal device, and transmits, to said server, control data for reflecting operating results for said operation on said terminal device.

3. The remote control system according to claim 2, wherein, based on said control data received from said terminal device, said server adjusts said three-dimensional model data to reflect the current state of said terminal device, and transmits the resultant three-dimensional model data to said client for rendering at said client.

4. The remote control system of claim 1, further comprising:
    a second client coupled to said server, for employing a web browser to designate a URL for said three-dimensional model data, and for downloading said three-dimensional model data so as to share said three-dimensional model data with said client;
    wherein said second client is configured to render said three-dimensional model data, and wherein said server further comprises a module for recording an operation performed by a user on the rendered three-dimensional model data as a three-dimensional operation event and for replaying, as needed, said three-dimensional operation event.

5. A server-client system comprising:
    a server, in which are stored three-dimensional model data in an object-oriented programming language program file, said three-dimensional model data representing a terminal device coupled to said server, and a program for controlling the terminal device;
    a first client connected to said server via a network, for calling, displaying and updating said three-dimensional model data, wherein said updating reflects an operation on said displayed three-dimensional model data corresponding to an operation to be performed on said terminal device; and
    a second client connected to said server via said network, for employing a web browser to designate a URL for said three-dimensional model data, and for downloading and displaying said three-dimensional model data received from said server so as to share said three-dimensional model data with said first client.

6. The server-client system according to claim 5, wherein said first and said second clients display said three-dimensional model data to reflect a current control state of said terminal device.

7. The server-client system according to claim 5, wherein one of said first and said second clients is a computer at a customer support center that supports said terminal device.

8. A control server for a terminal device, said control server comprising:
 a terminal device operation control program, for exchanging terminal device control data with a terminal device coupled to the control server, and for controlling the operation of said terminal device;
 three-dimensional model data for remote control of said terminal device, comprising geometrical data representing said terminal device and terminal device operating data received from said terminal device reflecting operating results of said terminal device; and
 a module, for recording an operation on said terminal device performed by a user via the three-dimensional model data as a three-dimensional operation event and for replaying, as needed, said three-dimensional operation event.

9. The control server according to claim 8, wherein said module employs recording/replaying software to record, as a three-dimensional VRML operation event, an operation performed by a user on the terminal device that is generated via a VRML browser, and replays and displays said VRML operation event via said VRML browser.

10. The control server according to claim 9, wherein said operation performed by said user is represented by the performance of an operation based on VRML contents, which are said three-dimensional model data written for said VRML browser using a VRML format.

11. The control server according to claim 8, further comprising a module for exchanging an operation event with a client coupled to said control server via a network.

12. A terminal device control method whereby a client exercises remote control of a terminal device, the method comprising:
 designating a URL at said client with a web browser, the URL corresponding to said terminal device, and downloading three-dimensional model data representing said terminal device;
 rendering at said client said three-dimensional model data that are downloaded;
 updating said three-dimensional model data at said client, said updating corresponding to an operation on said rendered three-dimensional model data corresponding to an operation to be performed on said terminal device; and
 transmitting operation control data for said operation to said terminal device in response to said updating.

13. The terminal device control method according to claim 12, wherein said transmitting comprises:
 transmitting the updated three-dimensional model data to a server; and
 employing said updated three-dimensional model data to transmit said operation control data from said server to said terminal device.

14. The terminal device control method according to claim 13, further comprising:
 transmitting control data for reflecting operating results from said terminal device to said server; and reflecting said control data to said three-dimensional model data, and transmitting the resultant three-dimensional model data from said server to said client.

15. A terminal device sharing method, for sharing among a plurality of clients information concerning a terminal device, the method comprising:
 employing a web browser at a first client to designate a URL corresponding to said terminal device, and downloading three-dimensional model data representing said terminal device;
 rendering said model data that are downloaded;
 updating the rendered model data by said first client, and transmitting the updated model data, the updated model data representing an operation on the rendered three-dimensional model data corresponding to an operation to be performed on said terminal device;
 employing a web browser at a second client to designate the URL, and downloading said three-dimensional model data; and
 receiving and rendering said updated model data at said second client.

16. Storage media on which is stored a computer-readable program that permits one or more computers to perform:
 a process of calling for three-dimensional model data representing a terminal device coupled to a network;
 a process of rendering said three-dimensional model data that has been called for to create an image;
 a process of calling for a control file associated with said three-dimensional model data, wherein the control file allows for one or more operations to be performed on the rendered three-dimensional model data corresponding to one or more operations performable on said terminal device; and
 a process of receiving control data from said terminal device after performing one or more of the one or more operations on the terminal device and reflecting the received control data to said three-dimensional model data in order to update the image.

17. Storage media according to claim 16, wherein said computer-readable program further permits one or more computers to perform: a process of receiving updated values of three-dimensional model data from a client coupled to a network, and of transmitting said control data to said terminal device for remote control thereof.

18. Storage media on which is stored a computer-executable program that permits one or more computers to perform:
 a process of calling for the transmission, via an external network, of three-dimensional model data representing a terminal device;
 a process of rendering said three-dimensional model data that is called for;
 a process of calling for a control file associated with said three-dimensional model data;
 a process of reflecting said control file to values of said three dimensional model data;
 a process of changing the values of said three-dimensional model data based on an operation on said three-dimensional model, wherein said operation corresponds to an operation to be performed on said terminal device; and
 a process of performing the operation on said terminal device, thereby effecting remote control of the terminal device via the operation on the three-dimensional model.

19. A program transmission apparatus comprising:
 storage means for storing a program that executes a process of calling for the transmission, via an external network, of three-dimensional model data representing a terminal device, a process of rendering said three-dimensional model data that has been called for, a process of calling for a control file associated with said three-dimensional model data, a process of reflecting the values in said control file to the values of said three-dimensional model data, a process of changing the values of said three-dimensional model data based on an operation performed by a user on said three-dimensional model, wherein said operation corresponds to an operation to be performed on said terminal device, and a process of performing the operation on said terminal device, thereby effecting remote control of the terminal device via the operation on the three-dimensional model; and transmission means for reading said program from said storage means and for transmitting said program to an external computer.

* * * * *